(12) United States Patent
Ishak et al.

(10) Patent No.: US 9,086,791 B2
(45) Date of Patent: Jul. 21, 2015

(54) METHODS, SYSTEMS, AND MEDIA FOR PROVIDING CONTENT-AWARE SCROLLING

(75) Inventors: Edward W. Ishak, Jersey City, NJ (US); Steven K. Feiner, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1404 days.

(21) Appl. No.: 12/674,476

(22) PCT Filed: Aug. 22, 2008

(86) PCT No.: PCT/US2008/074002
§ 371 (c)(1),
(2), (4) Date: Sep. 22, 2011

(87) PCT Pub. No.: WO2009/026508
PCT Pub. Date: Feb. 26, 2009

(65) Prior Publication Data
US 2012/0005623 A1 Jan. 5, 2012

Related U.S. Application Data

(60) Provisional application No. 60/957,398, filed on Aug. 22, 2007.

(51) Int. Cl.
*G06F 3/0485* (2013.01)
(52) U.S. Cl.
CPC .................................. *G06F 3/0485* (2013.01)
(58) Field of Classification Search
CPC ...................................................... G06F 3/0485
USPC .......................................................... 715/786
See application file for complete search history.

(56) References Cited

U.S. PATENT DOCUMENTS

| | | | | |
|---|---|---|---|---|
| 5,040,131 | A * | 8/1991 | Torres | 715/810 |
| 5,075,673 | A * | 12/1991 | Yanker | 345/163 |
| 5,339,391 | A * | 8/1994 | Wroblewski et al. | 345/607 |
| 5,495,566 | A * | 2/1996 | Kwatinetz | 715/785 |
| 5,506,951 | A | 4/1996 | Ishikawa | |
| 5,781,785 | A * | 7/1998 | Rowe et al. | 715/234 |
| 5,860,074 | A * | 1/1999 | Rowe et al. | 715/235 |
| 5,864,330 | A * | 1/1999 | Haynes | 715/856 |
| 6,211,879 | B1 * | 4/2001 | Soohoo | 715/854 |
| 6,259,432 | B1 * | 7/2001 | Yamada et al. | 345/159 |

(Continued)

OTHER PUBLICATIONS

CyberCoaster : Polygonal Line Shaped Slider Interface to Spatio-Temporal Media by Takashi Satou (1999 ACM).*

(Continued)

*Primary Examiner* — William Bashore
*Assistant Examiner* — Nathan Shrewsbury
(74) *Attorney, Agent, or Firm* — Byrne Poh LLP

(57) ABSTRACT

Methods, systems, and media for providing content-aware scrolling are provided. In accordance with some embodiments, a method for providing content-aware scrolling is provided, the method comprising: determining whether one or more regions of content in a document are important regions; generating a scroll path that passes through the important regions, wherein at least one of direction, speed, and zoom are varied along the scroll path based on characteristics of the important regions; and, in response to receiving a user input, traversing the generated scroll path through the important regions.

40 Claims, 11 Drawing Sheets

(56) References Cited

U.S. PATENT DOCUMENTS

| | | | |
|---|---|---|---|
| 6,317,128 B1 | 11/2001 | Harrison et al. | |
| 6,337,694 B1* | 1/2002 | Becker et al. | 345/684 |
| 6,339,437 B1* | 1/2002 | Nielsen | 715/787 |
| 6,407,749 B1* | 6/2002 | Duke | 345/684 |
| 6,721,953 B1* | 4/2004 | Bates et al. | 725/39 |
| 6,882,354 B1* | 4/2005 | Nielsen | 715/784 |
| 7,013,128 B2* | 3/2006 | Ozeki et al. | 455/411 |
| 7,061,474 B2 | 6/2006 | Hinckley et al. | |
| 7,173,637 B1* | 2/2007 | Hinckley et al. | 345/684 |
| 7,274,377 B2* | 9/2007 | Ivashin et al. | 345/619 |
| 7,716,597 B2* | 5/2010 | Plow et al. | 715/784 |
| 7,995,807 B2* | 8/2011 | Akahori | 382/118 |
| 8,381,121 B2* | 2/2013 | Gupta et al. | 715/784 |
| 2002/0135602 A1* | 9/2002 | Davis et al. | 345/684 |
| 2002/0186252 A1* | 12/2002 | Himmel et al. | 345/787 |
| 2003/0074635 A1* | 4/2003 | Cao | 715/513 |
| 2003/0142137 A1* | 7/2003 | Brown et al. | 345/786 |
| 2003/0169280 A1* | 9/2003 | Hsieh | 345/684 |
| 2004/0080541 A1* | 4/2004 | Saiga et al. | 345/805 |
| 2004/0218894 A1* | 11/2004 | Harville et al. | 386/46 |
| 2005/0246619 A1* | 11/2005 | Krause | 715/500 |
| 2006/0075358 A1* | 4/2006 | Ahokas | 715/784 |
| 2006/0114327 A1* | 6/2006 | Araya et al. | 348/207.99 |
| 2006/0115185 A1* | 6/2006 | Iida et al. | 382/305 |
| 2006/0199616 A1 | 9/2006 | Landschaft et al. | |
| 2007/0209017 A1* | 9/2007 | Gupta et al. | 715/781 |
| 2008/0068382 A1* | 3/2008 | Benayon et al. | 345/440 |
| 2010/0312766 A1* | 12/2010 | Horn | 707/737 |

OTHER PUBLICATIONS

Agrawala, M. and Stolte, C., "Rendering Effective Map Routes: Improving Usability Through Generalization", In Proceedings of the 28th Annual Conference on Computer Graphics and Interactive Techniques (SIGGRAPH 2001), Los Angeles, CA, USA, Aug. 12-17, 2001, pp. 241-250.

Ahlberg, C. and Shneiderman, B., "The Alphaslider: A Compact and Rapid Selector", In Proceedings of the SIGCHI Conference on Human Factors in Computing Systems (CHI '94), Boston, MA, USA, Apr. 24-28, 1994, pp. 365-371.

Akerstrom, R.A. and Todd, J.T., "The Perception of Stereoscopic Transparency", In Perception & Psychophysics, vol. 44, No. 5., Nov. 1988, pp. 421-432.

Badros, G.J., et al., "SCWM: An Extensible Constraint-Enabled Window Manager", In Proceedings of the FREENIX Track: 2001 USENIX Annual Technical Conference, Boston, MA, USA, Jun. 2001, pp. 225-234.

Baudisch, P. and Gutwin, C., "Multiblending: Displaying Overlapping Windows Simultaneously without the Drawbacks of Alpha Blending", In Proceedings of the SIGCHI Conference on Human Factors in Computing Systems (CHI 2004), Vienna, Austria, Apr. 24-29, 2004, pp. 367-374.

Baudisch, P. and Rosenholtz, R., "Halo: A Technique for Visualizing Off-Screen Locations", In Proceedings of the SIGCHI conference on Human factors in computing systems (CHI '03), Ft. Lauderdale, FL, USA, Apr. 5-10, 2003, pp. 481-488.

Baudisch, P., et al., "Fishnet, a Fisheye Web Browser with Search Term Popouts: a Comparative Evaluation with Overview and Linear View", In Proceedings of the Working Conference on Advanced Visual Interfaces (AVI D4), Gallipoli, Italy, May 25-28, 2004, pp. 133-140.

Beck, J. and Ivry, R., "On the Role of Figural Organization in Perceptual Transparency", In Perception & Psychophysics, vol. 44, No. 6, Dec. 1988, pp. 585-594.

Beck, J., et al., "The Perception of Transparency with Achromatic Colors", In Perception & Psychophysics, vol. 35, No. 5, May 1984, pp. 407-422.

Bederson, B.B., et al., "Pad++: A Zoomable Graphical Sketchpad for Exploring Alternate Interface Physics", In Journal of Visual Languages & Computing, vol. 7, No. 1, Mar. 1996, pp. 3-32.

Bell, B.A. and Feiner, S.K., "Dynamic Space Management for User Interfaces", In the Proceedings of the 13th Annual ACM Symposium on User Interface Software and Technology (UIST '00), San Diego, CA, USA, Nov. 5-8, 2000, pp. 238-248.

Bier, E.A., et al., "Toolglass and Magic Lenses: The See-Through Interface", In Proceedings of the 20th Annual Conference on Computer Graphics and Interactive Techniques (SIGGRAPH '93), vol. 27, Aug. 1993, pp. 73-80.

Bjork, S., "The ScrollSearcher Technique: Using Scrollbars to Explore Search Results", In Proceedings of INTERACT 2001, Tokyo, Japan, Jul. 9-13, 2001.

Blanch, R., et al., "Semantic Pointing: Improving Target Acquisition with Control-Display Ratio Adaptation", In Proceedings of the SIGCHI Conference on Human Factors in Computing Systems (CHI 2004), Vienna, Austria, Apr. 24-29, 2004, pp. 519-526.

Borning, A. and Duisberg, R., "Constraint-Based Tools for Building User Interfaces", In ACM Transactions on Graphics (TOG), vol. 5, No. 4, Oct. 1986, pp. 345-374.

Brewster, S.A., et al., "The Design and Evaluation of an Auditory-Enhanced ScrollBar", In Proceedings of the Conference Companion on Human Factors in Computing Systems (CHI '94), Boston, MA, USA, Apr. 24-28, 1994, pp. 173-179.

Burtnyk, N., et al., "StyleCam: Interactive Stylized 3D Navigation using Integrated Spatial & Temporal Controls", In Proceedings of the 15th Annual ACM Symposium on User Interface Software and Technology (UIST '02), 2002, pp. 101-110.

Card, S.K., et al., "The Information Visualizer: An Information Workspace", In Proceedings of the SIGCHI Conference on Human Factors in Computing Systems, (CHI '91), New Orleans, LA, USA, 1991, pp. 181-186.

Chang, B.W. and Ungar, D., "Animation: From Cartoons to the a User Interface", In Proceedings of the 6th Annual ACM Symposium on User Interface Software and Technology (UIST '93), Nov. 3-5, 1993, pp. 45-55.

Cockburn, A., et al., "Tuning and Testing Scrolling Interfaces that Automatically Zoom", In Proceedings of the SIGCHI Conference on Human Factors in Computing Systems (CHI '05), Portland, OR, USA, Apr. 2-7, 2005, pp. 71-80.

Cohen, E.S., et al., "Automatic Strategies in the Siemens RTL Tiled Window Manager", In Proceedings of the 2nd IEEE Conference on Computer Workstations, Santa Clara, CA, USA, Mar. 7-10, 1988, pp. 111-119.

Cohen, E.S., et al., "Constraint-Based Tiled Windows", In IEEE Computer Graphics and Applications, vol. 6, No. 5, May 1986, pp. 35-45.

Colby, G. and Scholl, L., "Transparency and Blur as Selective Cues for Complex Visual Information", In SPIE, vol. 1460, Aug. 1, 1991, pp. 114-125.

Comber, T. and Maltby, J., "Investigating Layout Complexity", In Proceedings of Graphics Interface, Jun. 1988, pp. 192-197.

Comber, T. and Maltby, J.R., "Evaluating Usability of Screen Design with Layout Complexity", In Proceedings of HCI (OZCHI '95), 1995, pp. 175-178.

Dietz, P. and Lehigh, D., "DiamondTouch: A Multi-User Touch Technology", In Proceedings of the 14th Annual ACM Symposium on User Interface Software and Technology (UIST '01), Orlando, FL, USA, Nov. 11-14, 2001, pp. 219-226.

Fleming, R.W. and Bulthoff, H.H., "Low-Level Image Cues in the Perception of Translucent Materials", In ACM Transactions on Applied Perception (TAP), vol. 2, No. 3, Jul. 2005, pp. 346-382.

Furnas, G.W., "Generalized Fisheye Views", In Proceedings of the SIGCHI Conference on Human Factors in Computing Systems (CHI '86), vol. 17, No. 4, Boston, MA, U.S.A., Apr. 13-17, 1986, pp. 16-23.

Galyean, T.A., "Guided Navigation of Virtual Environments", In Proceedings of the 1995 Symposium on Interactive 3D Graphics (13D '95), Monterey, CA, USA, 1995, pp. 103-104.

Graf, W., "Constraint-Based Graphical Layout of Multimodal Presentations", In World Scientific Series in Computer Science, vol. 36, 1992, pp. 365-385.

Graham, J., "The Reader's Helper: A Personalized Document Reading Environment", In Proceedings of the SIGCHI Conference on Human Factors in Computing Systems (CHI '99), Pittsburgh, PA, USA, May 15-20, 1999, pp. 481-488.

(56) References Cited

OTHER PUBLICATIONS

Harrison, B. L., et al., "An Experimental Evaluation of Transparent User Interface Tools and Information Content", In Proceedings of the 8th Annual ACM Symposium on User Interface and Software Technology (UIST '95), Pittsburgh, PA, USA, Nov. 1995, pp. 81-90.

Harrison, B.L., et al., "Transparent Layered User Interfaces: An Evaluation of Display Design Space to Enhance Focused and Divided Attention", In Proceedings of the SIGCHI Conference on Human Factors in Computing Systems (CHI '95), 1995, pp. 317-324.

Hudson, S.E. and Mohamed, S.P., "Interactive Specification of Flexible User Interface Displays", In ACM Transactions on Information Systems (TOIS), vol. 8, No. 3, Jul. 1990, pp. 269-288.

Hudson, S.E. and Smith, I., "Ultra-Lightweight Constraints", In Proceedings of the 9th Annual ACM Symposium on User Interface Software and Technology (UIST '96), Seattle, WA, USA, 1996, pp. 147-155.

Igarashi, T. and Hinckley, K., "Speed-Dependent Automatic Zooming for Browsing Large Documents", In Proceedings of the 13th Annual ACM Symposium on User Interface Software and Technology (UIST 2000), San Diego, CA, USA, 2000, pp. 139-148.

International Preliminary Report on Patentability in International Application No. PCT/US2008/074002, filed Aug. 22, 2008, mailed Mar. 4, 2010.

International Search Report in International Patent Application No. PCT/US2008/074002, filed Aug. 22, 2008, mailed Nov. 6, 2008.

Ishak, E.W. and Feiner, S.K., "Content-Aware Layout", CHI 2007 Work-In-Progress (poster), San Jose, CA, USA, Apr. 28-May 3, 2007, pp. 2459-2464.

Ishak, E.W. and Feiner, S.K., "Content-Aware Scrolling", In Proceedings of the 19th Annual ACM Symposium on User Interface Software and Technology (UIST 2006), Monteux, Switzerland, Oct. 15-18, 2006, pp. 155-158.

Ishak, E.W. and Feiner, S.K., "Free-Space Transparency: Exposing Hidden Content Through Unimportant Screen Space", Conference Supplement, UIST 2003, Vancouver, BC, Canada, Nov. 2-5, 2003, pp. 75-76.

Ishak, E.W. and Feiner, S.K., "Interacting with Hidden Content Using Content-Aware Free-Space Transparency", In Proceedings of the 17th Annual ACM Symposium on User Interface Software and Technology (UIST '04), vol. 6, No. 2, Santa Fe, NM, USA, Oct. 24-27, 2004, pp. 189-192.

Jacobs, C., et al., "Adaptive Grid-Based Document Layout", In ACM Transactions on Graphics (TOG), vol. 22, No. 3, Jul. 2003, pp. 838-847.

Jeffries, R., et al., "User Interface Evaluation in the Real World: A Comparison of Four Techniques", In Proceedings of the SIGCHI Conference on Human Factors in Computing Systems (CHI '91), 1991, pp. 119-124.

Khan, A., et al., "HoverCam: Interactive 3D Navigation for Proximal Object Inspection", In Proceedings of the 2005 Symposium on Interactive 3D Graphics and Games (I3D '05), Washington, D.C., USA, Apr. 3-6, 2005, pp. 73-80.

Kochhar, S., et al., "Interaction Paradigms for Human-Computer Cooperation in Graphical-Object Modeling", In Proceedings of Graphics Interface, Calgary, AL, Canada, Jun. 3-7, 1991, pp. 180-191.

Kurtenback, G. and Buxton, W., "Issues in Combining Marking and Direct Manipulation Techniques", In Proceedings of the 4th Annual ACM Symposium on User Interface Software and Technology (UIST '91), Hilton Head, SC, USA, Nov. 11-13, 1991, pp. 137-144.

Laakso, S.A., et al., "Improved Scroll Bars", In CHI '00 Extended Abstracts on Human Factors in Computing Systems, Apr. 1-6, 2000, pp. 97-98.

Leykin, A. and Tuceryan, M., "Automatic Determination of Text Readability Over Textured Backgrounds for Augmented Reality Systems", In Proceedings of the 3rd IEEE/ACM International Symposium on Mixed and Augmented Reality (ISMAR '04), Nov. 2-5, 2004, pp. 224-230.

Lieberman, H., "Powers of Ten Thousand: Navigating in Large Information Spaces", In Proceedings of the 7th Annual ACM Symposium on User Interface Software and Technology (UIST '94), Marina del Rey, CA., USA, Nov. 2-4, 1994, pp. 15-16.

Lok, S. and Feiner, S., "A Survey of Automated Layout Techniques for Information Presentations", In Proceedings of SmartGraphics Symposium 2001, Hawthorne, NY, USA, Mar. 2001, pp. 61-68.

Lok, S., et al., "Evaluation of Visual Balance for Automated Layout", In Proceedings of the 9th International Conference on Intelligent User Interfaces (IUI '04), Madeira, Funchal, Portugal, Jan. 13-16, 2004, pp. 101-108.

MacKenzie, I.S. and Riddersma, S., "Effects of Output Display and Control-Display Gain on Human Performance in Interactive Systems", In Behaviour & Information Technology, vol. 13, No. 5, 1994, pp. 328-337.

Mackinlay, J.D. and Heer, J., "Wideband Displays: Mitigating Multiple Monitor Seams", In CHI '04 Extended Abstracts on Human Factors in Computing Systems (CHI 2004), Vienna, Austria, Apr. 24-29, 2004, pp. 1521-1524.

Masui, T., "LensBar—Visualization for Browsing and Filtering Large Lists of Data", In Proceedings of the IEEE Symposium on Information Visualization (InfoVis '98), Oct. 19-20, 1998, pp. 113-120.

Masui, T., et al., "Elastic Graphical Interfaces for Precise Data Manipulation", In ACM Conference Companion on Human Factors in Computing Systems (CHI '95), Apr. 1995, pp. 143-144.

Moscovich, T. and Hughes, J.F., "Navigating Documents with the Virtual Scroll Ring", In Proceedings of the 17th annual ACM Symposium on User Interface Software and Technology (UIST '04), Santa Fe, NM, USA, Oct. 24-27, 2004, pp. 57-60.

Myers, B.A., "The Garnet User Interface Development Environment", In Conference Companion on Human Factors in Computing Systems (CHI '94), Boston, MA, USA, Apr. 24-28, 1994, pp. 25-26.

Myers, B.A., et al., "Marquise: Creating Complete User Interfaces by Demonstration", In Proceedings of the INTERACT '93 and CHI '93 Conference on Human Factors in Computing Systems, Amsterdam, The Netherlands, Apr. 24-29, 1993, pp. 293-300.

Norman, K.L., et al., "Cognitive Layouts of Windows and Multiple Screens for User Interfaces", In International Journal of Man-Machine Studies, vol. 25, No. 2, Aug. 1986, pp. 229-248.

Paley, W.B., "Designing Better Transparent Overlays by Applying Illustration Techniques and Vision Findings", In Adjunct Proceedings of the 16th Annual ACM Symposium on User Interface Software and Technology (UIST D3), Vancouver, BC, Canada, Nov. 2-5, 2003, pp. 85-86.

Porter, T. and Duff, T., "Compositing Digital Images", In ACM SIGGRAPH Computer Graphics , vol. 18, No. 3, Jul. 1984, pp. 253-259.

Purvis, L., "A Genetic Algorithm Approach to Automated Custom Document Assembly", In the Second International Workshop on Intelligent Systems Design and Application, Atlanta, GA, USA, 2002, pp. 131-136.

Rao, R. and Card, S.K., "The Table Lens: Merging Graphical and Symbolic Representations in an Interactive Focus+Context Visualization for Tabular Information", In Proceedings of the SIGCHI Conference on Human Factors in Computing Systems (CHI '94), Boston, MA, USA, 1994, pp. 318-322.

Robertson, G., et al., "The Task Gallery: A 3D Window Manager", In Proceedings of the SIGCHI Conference on Human Factors in Computing Systems (CHI 2000), Apr. 1-6, 2000, pp. 494-501.

Satou, T., et al., "CyberCoaster: Polygonal Line Shaped Slider Interface to Spatio-Temporal Media", In Proceedings of the 7th ACM International Conference on Multimedia (Part 2) , Orlando, FL, USA, Oct. 1999, p. 202.

Sears, A. and Lund, A.M., "Creating Effective User Interfaces", In IEEE Software, vol. 14, No. 4, Jul./Aug. 1997, pp. 21-24.

Sears, A., "Layout Appropriateness: A Metric for Evaluating User Interface Widget Layout", Technical Report, Dec. 8, 1992, pp. 1-23.

Singh, M. and Anderson, B.L., "Toward a Perceptual Theory of Transparency", In Psychological Review, vol. 109, No. 3, Jul. 2002, pp. 492-519.

Smith, G. M. and Schraefel, M.G., "The Radial Scroll Tool: Scrolling Support for Stylus—or Touch-Based Document Navigation", In Pro-

(56) References Cited

OTHER PUBLICATIONS ceedings of the 17th Annual ACM Symposium on User Interface Software and Technology (UIST '04), Santa Fe, NM, USA, Oct. 24-27, 2004, pp. 53-56.

Smith, R. and Taivalsaari, A., "Generalized and Stationary Scrolling", In Proceedings of the 12th Annual ACM Symposium on User Interface Software and Technology (UIST '99), Asheville, NC, USA, 1999, pp. 1-9.

Stille, S., et al., "A2DL—An Adaptive Automatic Display Layout System", In Proceedings of the Third Annual Symposium on Human Interaction with Complex Systems (HICS '96), Aug. 25-28, 1996, pp. 243-250.

Stroop, J.R., "Studies of Interference in Serial Verbal Reactions" In Journal of Experimental Psychology, vol. 18, No. 6, Dec. 1935, pp. 643-662.

Tan, D.S., et al., "Exploring 3D Navigation: Combining Speed-Coupled Flying with Orbiting", In Proceedings of the SIGCHI Conference on Human Factors in Computing Systems (CHI 2001), vol. 3, No. 1, Seattle, WA, USA, Mar. 31-Apr. 5, 2001, pp. 418-425.

Weitzman, L. and Wittenburg, K., "Automatic Presentation of Multimedia Documents Using Relational Grammars", In Proceedings of the Second ACM international Conference on Multimedia (Multimedia '94), New York, NY, USA, Oct. 1994, pp. 443-452.

Woods, D.D., "Visual Momentum: A Concept to Improve the Cognitive Coupling of Person and Computer", In International Journal of Man-Machine Studies, vol. 21, No. 3, Sep. 1984, pp. 229-244.

Written Opinion in International Patent Application No. PCT/US2008/074002, filed Aug. 22, 2008, mailed Nov. 6, 2008.

Zanden, B.V. and Myers, B.A., "Automatic, Look-and-Feel Independent Dialog Creation for Graphical User Interfaces", In Proceedings of the SIGCHI Conference on Human Factors in Computing Systems (CHI '90), Apr. 1990, pp. 27-34.

Zeleznik, R. and Forsberg, A., "UniCam—2D Gestural Camera Controls for 3D Environments", In Proceedings of the 1999 Symposium on Interactive 3D Graphics (I3D '99), Atlanta, GA, USA, 1999, pp. 169-173.

Zeleznik, R., et al., "Pop Through Button Devices for VE Navigation and Interaction", In Proceedings of IEEEE Virtual Reality, 2002, pp. 127-134.

Zeleznik, R., et al., "Pop Through Mouse Button Interactions: A Simple Hardware Change and Its Software UI Impact", In Proceedings of the 14th Annual ACM Symposium on User Interface Software and Technology (UIST '01), Orlando, FL, USA, Nov. 2001.

Zellweger, P.T., "Scripted Documents: A Hypermedia Path Mechanism", In Proceedings of the Second Annual ACM Conference on Hypertext (Hypertext '89), Nov. 1989, pp. 1-14.

Zhai, S., et al., "Improving Browser Performance: A Study of Four Input Devices for Scrolling and Pointing Tasks", In Proceedings of INTERACT97: The Sixth IFIP Conference on Human-Computer Interaction, Sydney, Australia, Jul. 14-18, 1997, pp. 286-292.

Zhou, M.X. and Ma, S., "Toward Applying Machine Learning to Design Rule Acquisition for Automated Graphics Generation", In Proceedings AAAI Spring Symposium Series on Smart Graphics, Stanford, CA, USA, Mar. 20-22, 2000, pp. 16-23.

\* cited by examiner

METHODS, SYSTEMS, AND MEDIA FOR PROVIDING CONTENT-AWARE SCROLLING

CROSS REFERENCE TO RELATED APPLICATION

This application claims the benefit of U.S. Provisional Patent Application No. 60/957,398, filed Aug. 22, 2007, which is hereby incorporated by reference herein in its entirety.

STATEMENT REGARDING FEDERALLY SPONSORED RESEARCH OR DEVELOPMENT

This invention was made with government support under Grant No. ITS-0121239 awarded by the National Science Foundation (NSF) and under Grant No. N00014-04-1-0005 awarded by the Office of Naval Research (ONR). The government has certain rights in the invention.

TECHNICAL FIELD

The disclosed subject matter relates to methods, systems, and media for providing content-aware scrolling.

BACKGROUND

In many applications, such as Adobe Acrobat, Microsoft Internet Explorer, and Google's Picasa, scrollbars are provided for navigating large documents on small display screens or in small windows. Scrolling is generally performed with two separate scrollbars—i.e., one scrollbar placed to the right of the window that allows a user to scroll along the vertical axis and another scrollbar placed at the bottom of the window that allows the user to scroll along the horizontal axis. Note that, when using these scrollbars, scrolling along either the vertical axis or the horizontal axis can be done independently, but not simultaneously.

Moreover, interacting with multiple-column, multiple-page documents in small windows or on small displays (e.g., on a mobile device) often results in the user being interrupted when transitioning from the end of one column or page to the beginning of the next column or page. In addition, navigating these transitions typically requires the use of a two-dimensional input device, such as a mouse for scrolling between columns and pages. This can be especially tedious when the display is smaller than the size at which a page of the document can comfortably be read.

Various approaches and hardware devices attempt to address these problems by allowing users to scroll in an arbitrary two-dimensional direction. For example, a mouse button may be used to define an initial anchor position, such that the scrolling direction is determined by the vector between the anchor position and the potentially changing position of the mouse cursor and the scrolling speed is proportional to the magnitude of that vector. However, each such approach or device requires precise steering to navigate a potentially complex two-dimensional path required for reading, for example, a multiple-column, multiple-page document. Furthermore, systems that allow two-dimensional panning often require that the user "clutch" and "declutch" the mouse (i.e., physically lift and move the mouse to reposition it) due to large traversal distances.

Another approach attempts to address these problems by reformatting the content to provide user with one-dimensional navigation in the vertical direction. For example, the content may be reformatted by turning a multiple-column document into a single column document that fits within the width of the display device. This, however, makes it difficult for users to relate material in the reformatted document to material in the original document. More particularly, this approach ignores the importance of the intended layout of the document.

Other approaches designate an ordered set of discrete items in a display and use keystrokes to navigate from one discrete item to another. For example, Microsoft Internet Explorer and other web browsers allow users to navigate through a set of hyperlinks on a webpage using the tab and shift tab keys. This approach, however, is not effective on documents that do not contain author-constructed hyperlinks. That is, a content path cannot be automatically extracted from the webpage or other document.

There is therefore a need in the art for approaches that provide content-aware scrolling. Accordingly, it is desirable to provide methods, systems, and media that overcome these and other deficiencies of the prior art.

SUMMARY

Methods, systems, and media for providing content-aware scrolling are provided. In accordance with some embodiments, a method for providing content-aware scrolling is provided, the method comprising: determining whether one or more regions of content in a document are important regions; generating a scroll path that passes through the important regions, wherein at least one of direction, speed, and zoom are varied along the scroll path based on characteristics of the important regions; and, in response to receiving a user input, traversing the generated scroll path through the important regions.

In some embodiments, a system for providing content-aware scrolling is provided, the system comprising: means for determining whether one or more regions of content in a document are important regions; means for generating a scroll path that passes through the important regions, wherein at least one of direction, speed, and zoom are varied along the scroll path based on characteristics of the important regions; and means for traversing the generated scroll path through the important regions in response to receiving a user input.

In some embodiments, a system for providing content-aware scrolling is provided, the system comprising a processor that: determines whether one or more regions of content in a document are important regions; generates a scroll path that passes through the important regions, wherein at least one of direction, speed, and zoom are varied along the scroll path based on characteristics of the important regions; and, in response to receiving a user input, traverses the generated scroll path through the important regions.

In some embodiments, a computer-readable medium storing computer-executable instructions that, when executed by a processor, causes the processor to perform a method for providing content-aware scrolling is provided. The method comprising: determining whether one or more regions of content in a document are important regions; generating a scroll path that passes through the important regions, wherein at least one of direction, speed, and zoom are varied along the scroll path based on characteristics of the important regions; and, in response to receiving a user input, traversing the generated scroll path through the important regions.

DETAILED DESCRIPTION

Figure 1:
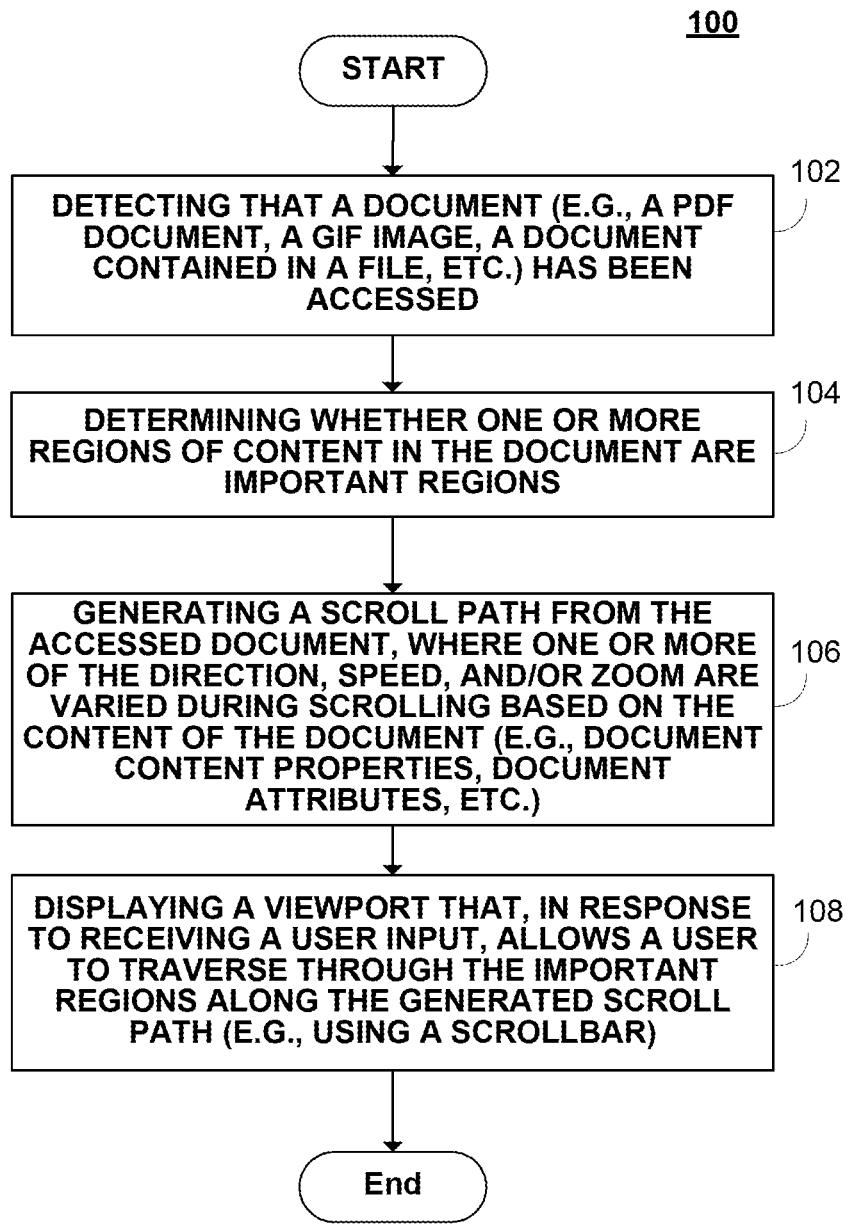
FIG. 1 is a diagram of a mechanism for providing content-aware scrolling in accordance with some embodiments.

In accordance with various embodiments, mechanisms for providing content-aware scrolling are provided. These mechanisms can be used in a variety of applications. For example, content-aware scrolling can be provided to significantly enhance a user's experience when viewing portable document format (PDF) files on handheld displays or mobile devices. A scroll path can be automatically mapped, where one or more of the direction, speed, and/or zoom can be varied during scrolling based on the content properties of the document. For example, when reading a multiple-column, multiple-page text document, a scroll path is mapped through the text, such that when reaching the end of one column, the user is automatically steered towards the beginning of the next column. As another example, for an image displaying the faces of multiple people, a scroll path can be automatically mapped through each face in the image, where one or more of the direction, speed, and/or zoom between each face are varied during scrolling. As yet another example, for reviewing keyword or textual search results, a scroll path can be automatically mapped through each search result, where one or more of the direction, speed, and/or zoom between each search result are varied during scrolling.

In some embodiments, these mechanisms can detect that a document (e.g., a document in PDF format, an image contained in a file, a document contained in a file, etc.) has been accessed. In response to detecting that the document has been accessed, the contents of the document can be extracted. For example, in response to opening a PDF document, each character, word, and line of text and associated attributes (e.g., pixel location, dimensions, font style, font size, font face, etc.) are extracted. Upon extracting the contents of the document, these mechanisms can determine which portions of the extracted content are important regions. A scroll path can then be generated for the document, along which one or more of the direction, speed, and/or zoom are varied during scrolling based on the extracted content and its attributes. A viewport or any suitable window that provides the viewable portion of the document can be provided (in some embodiments, with a single scrollbar) that, in response to receiving a user input, allows the user to traverse through the important regions along the generated scroll path. The user can view the unmodified content of the document in its intended layout along a two-dimensional scroll path while using a single scrollbar, mouse wheel scrolling, or any other suitable approach to traverse it.

It should be noted that, in some embodiments, these mechanisms can detect that a particular operation or task is being performed. For example, in response to detecting that a search operation associated with an application has been executed and, upon receiving the search results, the mechanism can designate the search results as the important regions. A scroll path can be generated, where one or more of the direction, speed, and/or zoom between each search result are varied during scrolling.

It should also be noted that, in some embodiments, these mechanisms can detect that a particular type of document or file has been accessed. For example, in response to detecting that an image (e.g., a digital photograph) has been opened using an image viewing application, the mechanisms can designate the faces or other particular objects in the image as the important regions. A scroll path through each of the faces or objects can be generated, where one or more of the direction, speed, and/or zoom between each face or object are varied during scrolling. This can, for example, allow the user to traverse quickly through unimportant regions of the image.

It should also be noted that these mechanisms are not limited to a particular type of content that can be navigated. Typical types of content can include word processing documents, including those containing images and other objects in addition to text, text documents, images in various formats, maps (which can be a particular type of image), web pages, etc. Other typical types of documents include spreadsheets, drawings, and illustrations.

In accordance with some embodiments, a scroll path can be provided using a process 100 as illustrated in FIG. 1. As shown, in response to detecting that a document has been accessed at 102, important regions of the content of the document are determined at 104.

Figure 2:
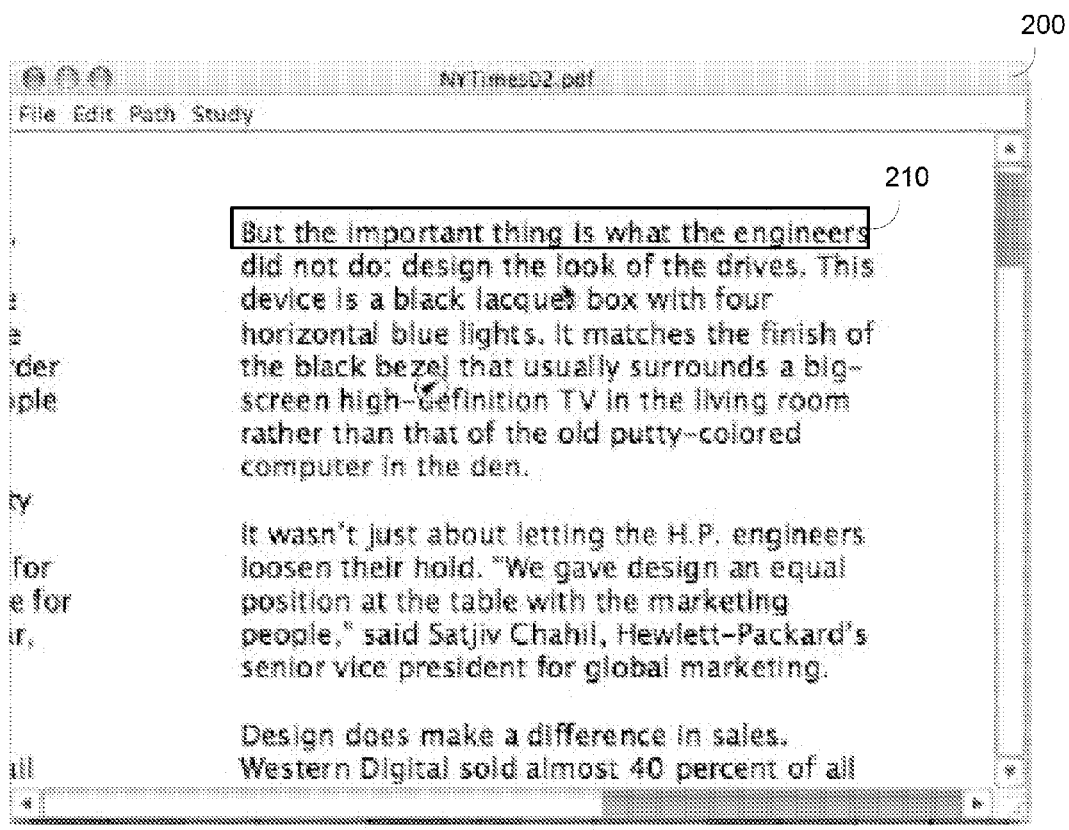
FIG. 2 is a diagram showing an example of an important region in a document in accordance with some embodiments.

As described previously, in response to determining that a document (e.g., a document contained in a file) has been accessed, the contents of the document can be extracted. For example, a text extraction tool (e.g., PDFBox) can be used to extract each character, word, and line of text and associated attributes (e.g., pixel location, dimensions, font style, font size, font face, etc.). To create a scroll path that assists the user in reading and/or reviewing the document, an important region can be an area as illustrated in FIG. 2. For a document 200, one of the important regions can be region 210 having an area, where the width spans the left edge of the first character ("B" of "But") to the right edge of the last character ("s" of "engineers") on a line and where the height is the height of that line. These text-line-sized important regions (e.g., important region 210) can form contiguous stacks of rectangular areas, which can vary in width and height. As the path between these stacked areas is continuous, the regions between these rectangular areas are designated as unimportant regions. For example, when the next line of text is in a different column or on a different page, the distance along the path that lies within unimportant regions can be as large as thousands of pixels.

Figure 7B:
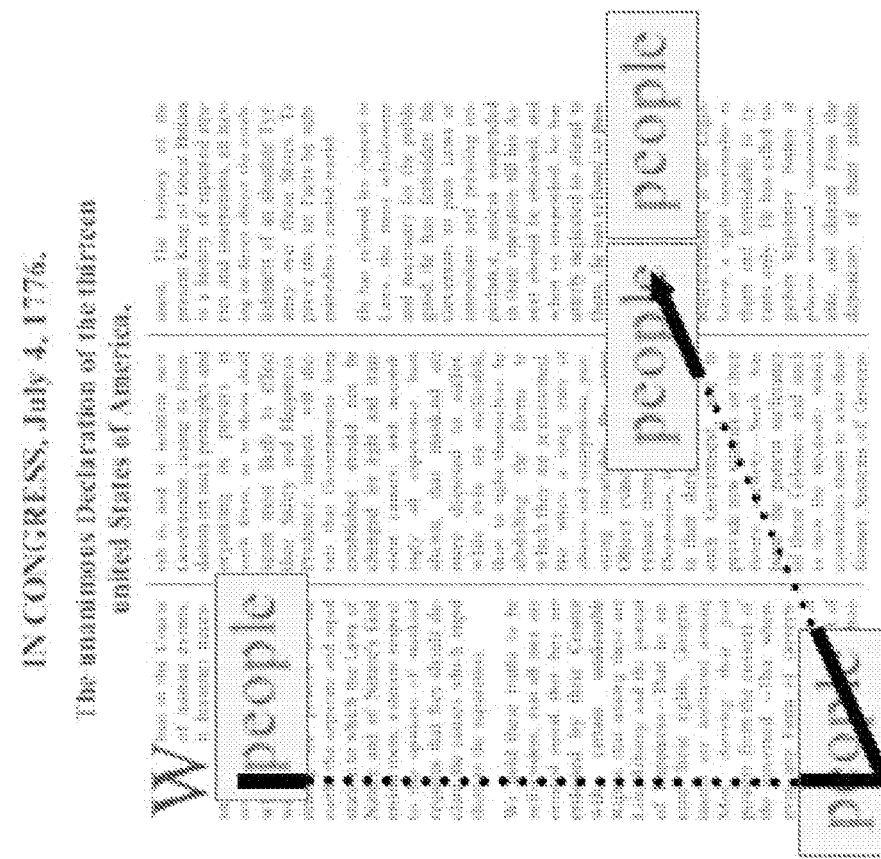
FIGS. 7A and 7B are diagrams showing examples of different scroll paths based on the performed task in accordance with some embodiments.

As another example, when reviewing directions from a map service (e.g., Google Maps, Mapquest, etc.), one of the important regions can be a region that includes one line of directions (e.g., turn left on Main Street) and its associated map (e.g., a detailed map of the area including the turn onto Main Street). As yet another example, when reviewing search results from a keyword search (e.g., a search for the word "people" in a document), one of the important regions can be an occurrence of the keyword (e.g., as shown in FIG. 7B, the word "people" in the first paragraph of the first page). Any suitable portion of a document can be designated as an important region.

Figure 3:
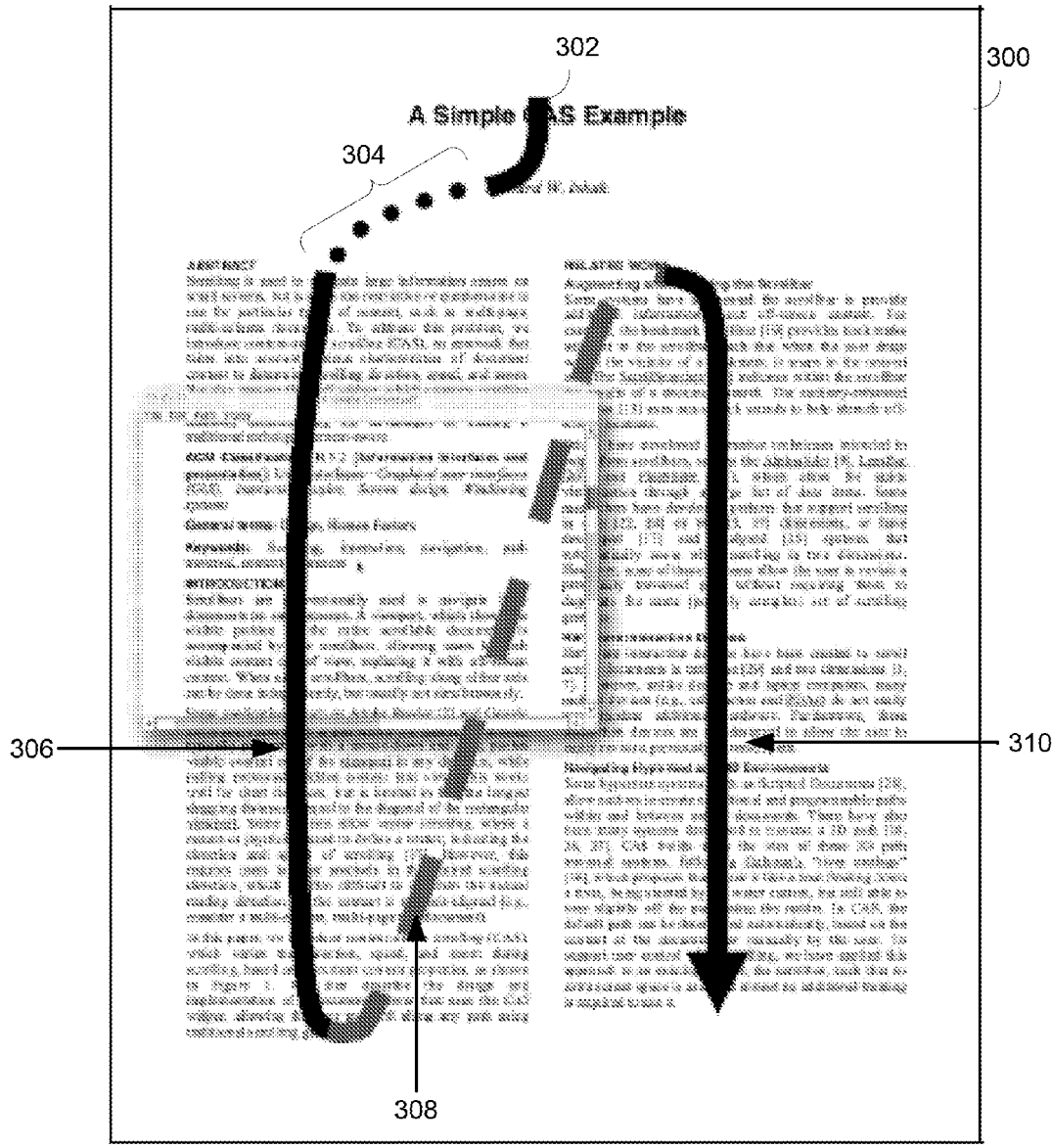
FIG. 3 is a diagram showing an example of a scroll path that traverses through important and unimportant regions of content in accordance with some embodiments.

FIG. 3 provides an example of important regions of content and unimportant regions of content in a document. As shown, the solid portions of scroll path 302, 306, and 310 have been designated as important regions of content and the dotted or dashed portions 304 and 308 have been designated as unimportant regions of content. Dotted portion 304 shows an example of a small unimportant region that can be traversed with a different scroll distance mapping (e.g., sped up, 2×, 3×, etc.) and dashed portion 308 shows an example of a large unimportant region. As will be discussed, large unimportant regions can be traversed with an animation (e.g., a slow-in, slow-out animation) or any other suitable graphics or effects.

It should be noted that the solid portions of the scroll path and the dotted or dashed portions of the scroll path shown in FIGS. 3, 4, 7A, 7B, and 9 are presented for purposes of illustration only. These portions of the scroll path are not displayed to the user or overlaid onto the document, for example, when the user is scrolling through search results in a document.

Referring back to FIG. 1, a scroll path is generated, where one or more of the direction, speed, and/or zoom are varied during scrolling based on the content of the document (e.g., document attributes, document content properties, designated important regions, etc.) at 106. A viewport or any suitable window that provides the viewable portion of the document can be provided that, in response to receiving a user input, allows the user to traverse through the important regions along the generated scroll path at 108.

As shown in FIG. 3, as opposed to treating the document as a single undifferentiated layer of information, a scroll path is generated, where the properties and/or attributes of the content (e.g., pixel location, dimensions, font style, font size, font face, etc.) are taken into account to identify important regions of the content in which to vary the scroll direction, speed, and/or zoom. In FIG. 3, where the content of the first page of document 300 is divided into two columns, the scroll path is a reading path (or the path in which the document is intended to be read). The scroll path begins with solid region 302 at the title portion of document 300, varies its direction from the top of the first column to the bottom of the first column, the bottom of the first column to the top of the second column, and the top of the second column to the bottom of the second column, and ends with solid region 310 at the bottom of the second column for that particular page. With the scroll path, the intended layout of the document is preserved, thereby allowing the user to view the unmodified content of the document. It should be noted that a scroll path that continues for multiple pages can be generated, but the scroll path in FIG. 3 is shown for a single page to avoid overcomplicating the drawing.

Figure 4:
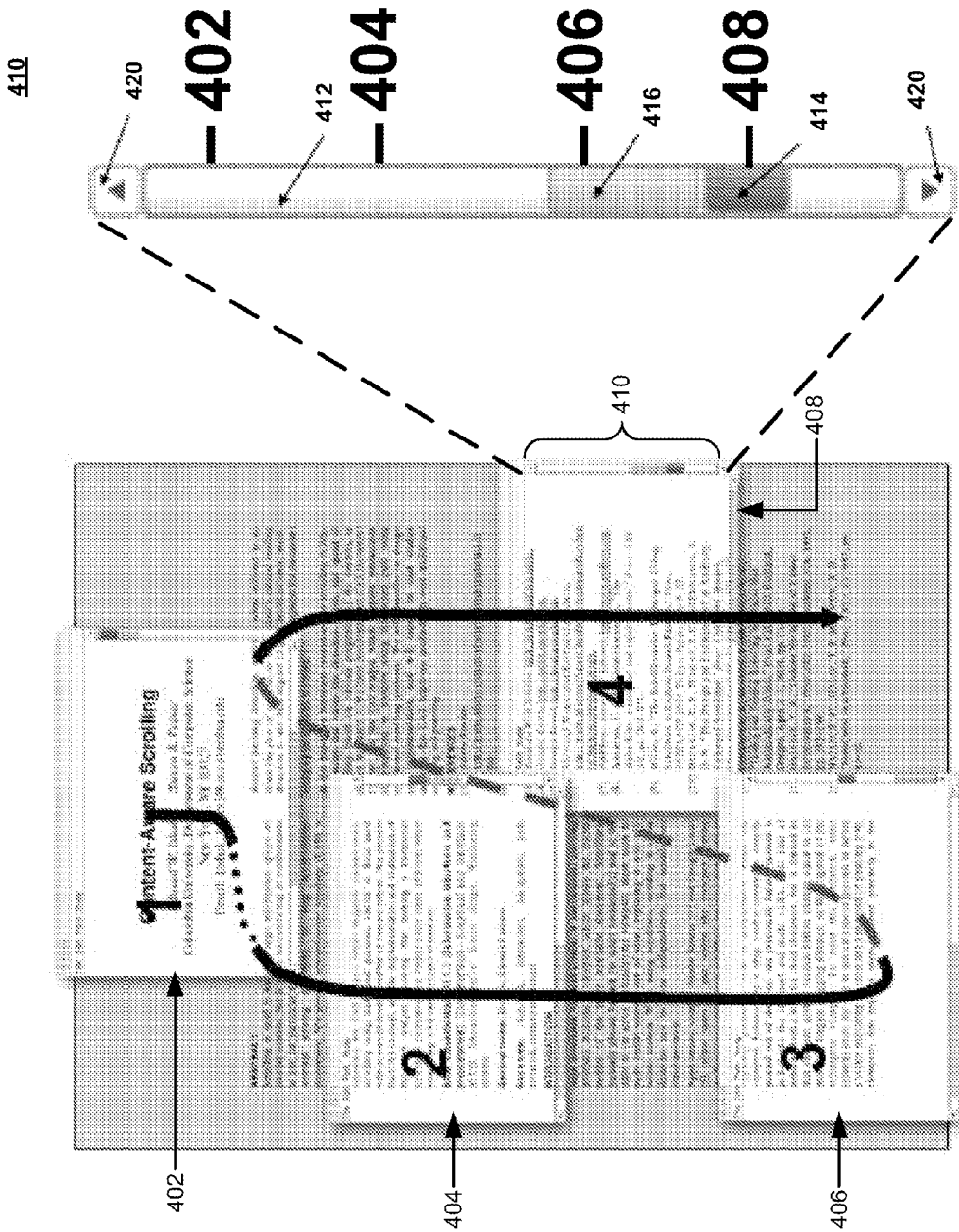
FIG. 4 is a diagram showing the same viewport at different positions along the scroll path and the single scrollbar provided in a content-aware scrolling mode in accordance with some embodiments.

FIG. 4 shows examples of the same viewport at different positions along the scroll path in accordance with some embodiments. The viewport (e.g., viewport 402 at position 1, viewport 404 at position 2, viewport 406 at position 3, and viewport 408 at position 4) provides the viewable portion of the document along with a single scrollbar 410. Scrollbar 410 includes a track 412 and scroll path knob 414. Scroll path knob 414 indicates the locations of the viewport in relation to the scroll path. As shown, the scroll path knob corresponds to viewport 408 (at position 4).

In some embodiments, scrollbar 410 can include an additional (inactive) knob 416 that indicates the conventional scroll position. For example, scrollbar 410 can include both scroll path knob 414 to indicate the position along the scroll path and a conventional scroll knob to indicate the conventional scroll position. Alternatively, the user can be provided with an option to remove the additional (inactive) knob 416 from the viewport.

In some embodiments, scrollbar 410 includes buttons 420. In response to the user selecting one of the buttons 420 (e.g., using a mouse), the viewport can incrementally traverse forwards or backwards along the scroll path in the selected direction. In some embodiments, in response to the user positioning the mouse and selecting outside knob 414 on track 412, the viewport can advance the document along the scroll path by a given portion of the scroll path. For example, the portion of the document in the newly displayed viewport slightly overlaps the portion of the document displayed in the previously displayed viewport. In another example, each click of the mouse on track 412 can advance the viewport by a predetermined portion of the scroll path (e.g., one-eighth of the scroll path, five percent of the scroll path, etc.).

In some embodiments, the viewport can be provided without scrollbar 410, scroll path knob 414, and additional (inactive) knob 416. In one example, the user can be provided with options relating to the presentation of the viewport. The options can include selectable buttons or any other suitable user interface that allow the user to select whether to display scrollbar 410 while traversing the generated scroll path through important regions. In another example, these content-aware scrolling mechanisms can provide the viewport without providing scrollbar 410 while traversing the generated scroll path through important regions.

It should be noted that, in some embodiments, these content-aware scrolling mechanisms can be initiated within an application (e.g., Adobe Acrobat, Microsoft Internet Explorer, etc.) by changing the scrolling mode. For example, the user can change the scrolling mode from "normal" (e.g., a conventional scrolling approach) to "CAS" (a content-aware scrolling approach in accordance with some embodiments) through a menu option, a toolbar option, the depression of a button on a keyboard (e.g., the "alt" key), and/or any other suitable approach. In response to enabling the content-aware scrolling mode, if the current viewport position does not contain a part of the document along the scroll path (or reading path), the viewport can automatically pan to the nearest point along the scroll path. If the viewport is too narrow for a particular point along the scroll path, a horizontal scrollbar can be provided that allows left-right scrolling that spans only the width of the content on the scroll path. Note that the document orientation does not change along the scroll path.

It should also be noted that, in some embodiments, mouse wheel scrolling or any other suitable scrolling mechanism can be supported, which assists users in maintaining precise control when traversing long scroll paths. As described previously, these content-aware scrolling mechanisms can provide the viewport without providing a scrollbar, such as scrollbar 410. For example, in some embodiments, only the mouse scroll wheel is required to scroll forwards and backwards along the scroll path of the document.

In some embodiments, the user can temporarily venture away from the generated scroll path. For example, in response to depressing a particular key on the keyboard (e.g., a shift key), depressing a button on a mouse (e.g., a right mouse button), and/or using any other suitable approach, the current location on the scroll path can be anchored. In response to releasing the particular key or button, the viewport can return to the anchored location on the scroll path. For example, an animation (e.g., a slow-out animation) or any other suitable effect can be used to return the user to the current location on the scroll path.

Alternatively, the user can change from the content-aware scrolling mode to a conventional scrolling mode. In response to the user changing back to the content-aware scrolling mode, the user can be returned to the previous location on the scroll path.

In some embodiments, in addition to varying the scroll direction during scrolling, the scrolling speed can be modified during scrolling. For example, the scrolling speed can be modified based on the location of important regions. The scrolling distance mapping, m, can be defined as $\Delta d_{knob}/\Delta d_{doc}$, or the ratio of the pixel distance that the knob 414 of FIG. 4 is dragged ($\Delta d_{knob}$) to the pixel distance that the document is scrolled ($\Delta d_{doc}$). This ratio varies as a function of the distance, D, from the current path point to the next important region relative to the size of the viewport. For example, when a scroll path is generated to traverse through search results within a text document, the continuous scroll path can contain multiple and possibly large unimportant regions (regions that do not contain search results). Accordingly, the scrolling distance mapping is changed through these unimportant regions (shown as the dotted parts of the path in FIG. 7B), while receiving a constant physical scrolling gesture. For example, the scrolling speed can be increased to three times the current scrolling speed (or any other suitable speed) to traverse the unimportant regions.

In some embodiments, the scrolling speed can be modified using animations through substantially large distances between unimportant regions. For example, for distances larger than the diagonal of the viewport (e.g., viewports 402, 404, 406, and 408), the viewport can automatically traverse to the next important region using a "slow-in, slow-out" animated change in speed. As shown in FIG. 3, the distance between the bottom of the first column and the top of the second column (dashed region 308) is larger than the diagonal of the viewport. Accordingly, through an animation, the user quickly traverses the unimportant region to the next important region.

It should be noted that, in some embodiments, a visual indication can be provided to the user, where the visual indication notifies the user that an animation (e.g., a "slow-in, slow out" animation) is about to occur. For example, by providing such a visual indication (e.g., a graphic, an icon, etc.), the user can decide whether to inhibit the animation from occurring or continue scrolling to proceed with the animation. In another example, if the user receives the visual indication and the user has not finished reading the portion of content in the viewport, the user can stop scrolling along the scroll path, thereby inhibiting the animation from occurring.

Figure 5:
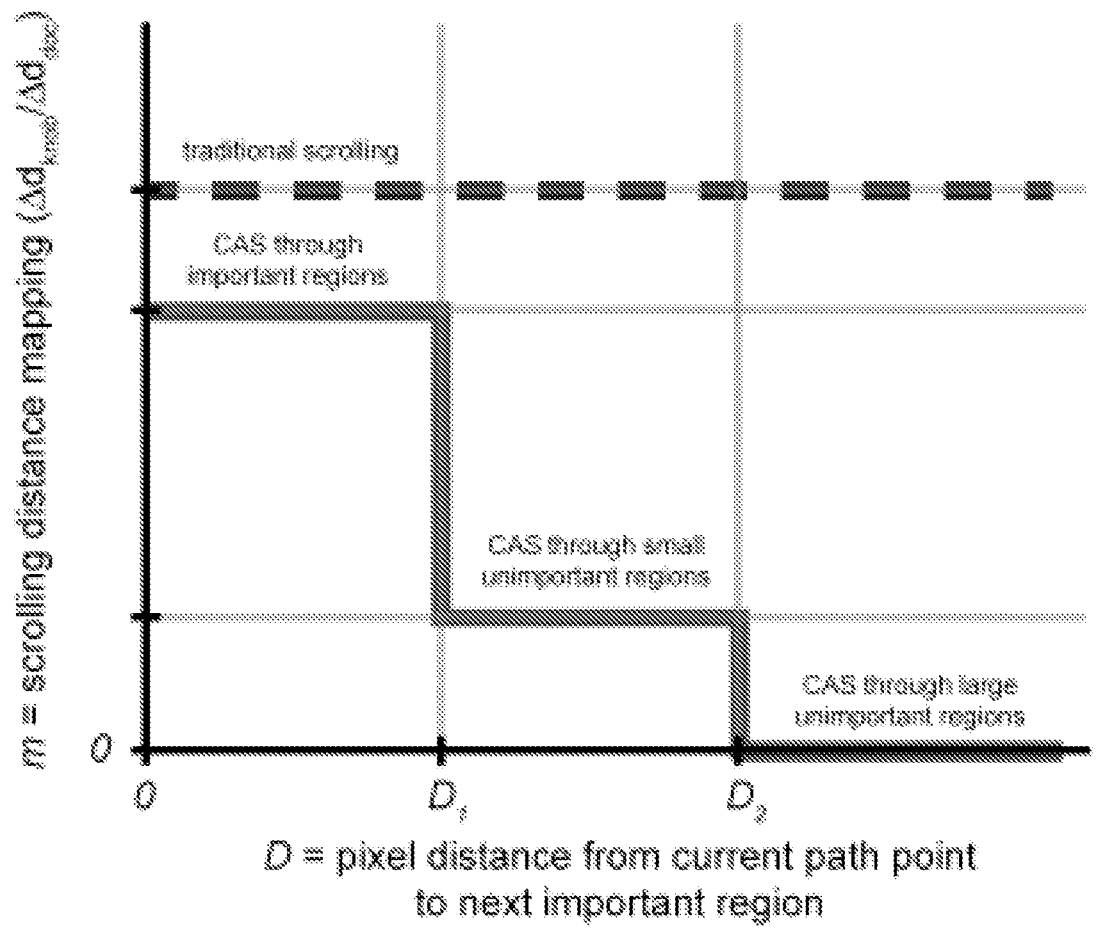
FIG. 5 is a diagram showing the relationship between the scrolling distance mapping (m) and the pixel distance between the current path point and the next important region along the scroll path (D) in accordance with some embodiments.

As shown in FIG. 5, the value, m, is the ratio of scrollable pixels in the scrollbar to those along the document path. Note that this value is typically constant in conventional scrolling (as shown by the dashed line). Note that, in FIG. 5, $D_1$ is defined as a distance equivalent to about half the diagonal of the viewport and $D_2$ is defined as a distance equivalent to about the diagonal of the viewport. If D is greater than $D_1$, the mapping m is reduced by 1/x (e.g., to triple the scrolling speed). If D is substantially larger (e.g., greater than $D_2$), a "slow-in, slow-out" animation or any other suitable animation is performed to automatically traverse the scroll path to the next important region and no scrolling is required (mapping m=0).

Consider the scrollbar length, s, scrollable path length, p, (parts of the scroll path not containing large unimportant regions through which animations are used), the sum of the parts of the path containing important regions, $p_i$, and the speedup factor through unimportant regions not traversed by an animation, x (e.g., to triple the scrolling speed, x=3). The scrolling distance mapping, m, can be represented as:

$$m = \begin{cases} \dfrac{s_i}{p_i} & \text{if } D < \dfrac{d}{2} \\ \dfrac{s_i}{p_i x} & \text{if } \dfrac{d}{2} \leq D < d \\ 0 & \text{if } D \geq d \end{cases},$$

where $s_i = s\left(1 - \dfrac{\beta}{x}\right)$, and $\beta = 1 - \dfrac{p_i}{p}$.

It should be noted that the variable $s_i$ is defined as the sum of the parts of the scrollbar through which important regions are scrolled. It should also be noted that the variable $\beta$ is the fraction of the path that contains unimportant regions.

In some embodiments, the zoom level can be modified. The zoom level of the document can be modified based on the size of and distance between important regions. For example, a zoom level initially set at 200% can be reduced (e.g., to 150%) while traversing through unimportant regions if the width of the regions cannot fit within the current viewport. In some embodiments, a reduction in zoom level is only performed through unimportant regions.

Figure 6A:
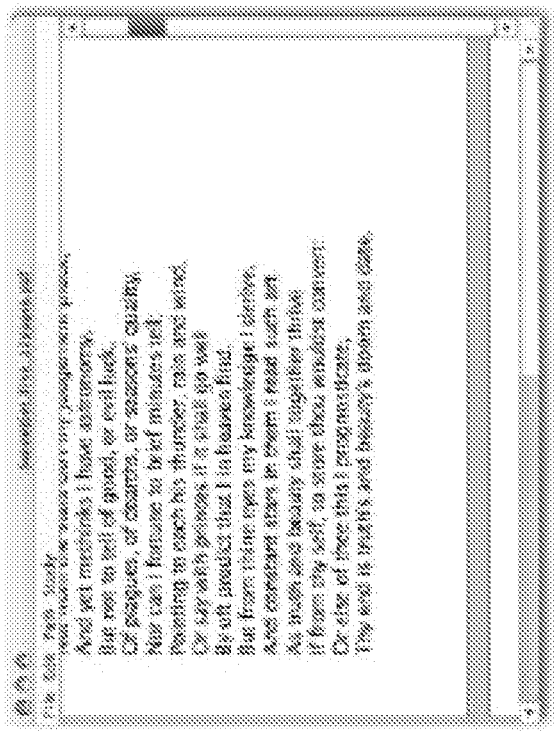
FIGS. 6A and 6B are diagrams showing examples of positioning the viewport in response to detecting page breaks in accordance with some embodiments.
Figure 6B:
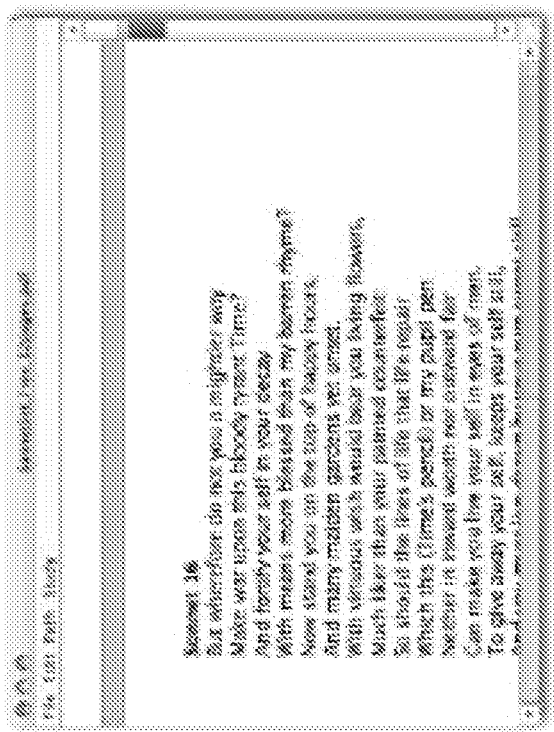

In some embodiments, page breaks can be detected and the position of the viewport can be adjusted in response to such page breaks. To account for user interactions with content near column and page boundaries, the scrolling animation can be modified to anticipate column and screen edges. For example, an animation between the bottom of a column to the top of an adjacent column can occur as soon as the page edge is visible within the viewport (as shown in FIG. 6A). In another example, to ensure that the user does not ignore or fail to review content at the bottom of a column, an animation between the bottom of a column to the top of an adjacent column can occur in response to the top edge of the viewport being a particular distance from the page edge. Similarly, in response to an animation that leads to the beginning of a new column or a new page, the viewport can be positioned to show the leading page break (as shown in FIG. 6B).

Figure 7A:
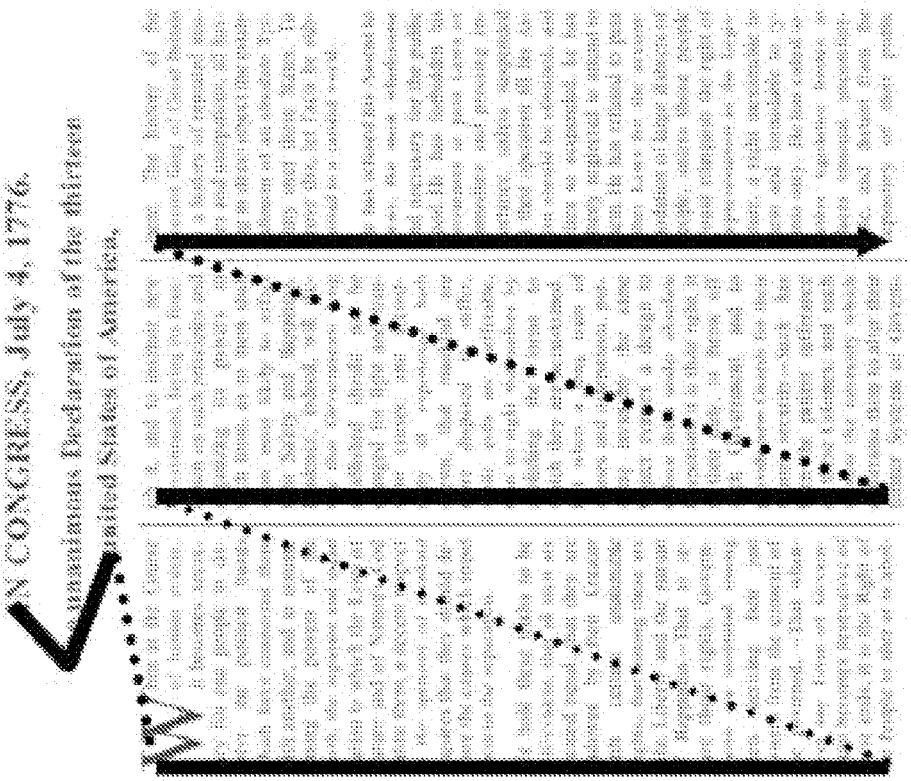

In accordance with some embodiments, these mechanisms can detect that a particular operation or task is being performed. For example, FIG. 7A shows an example, where a scroll path that follows the path in which the document is intended to be read is generated in response to detecting that a document has been opened. As another example, FIG. 7B shows an example, where, in response to detecting that a text or keyword search operation associated with an application has been executed, a scroll path that follows the path in which the search results are to be reviewed is generated. The path, for example, can start at the first string occurrence, pan directly to the second occurrence, etc. As described previously, if two consecutive search results or occurrences are substantially far apart (e.g., greater than a distance equivalent to the diagonal of the viewport), the scrolling speed can be sped up and/or animated between those two search results.

It should be noted that the solid portions of the path shown in FIG. 7B represent the important regions of content, while the dotted or dashed portions of the path represent the unimportant regions (e.g., regions without search results). Again, it should also be noted that the solid portions of the scroll path and the dotted or dashed portions of the scroll path shown in FIGS. 3, 4, 7A, 7B, and 9 are presented for purposes of illustration only. These portions of the scroll path are not displayed to the user or overlaid onto the document, for example, when the user is scrolling through search results in a document.

Figure 8:
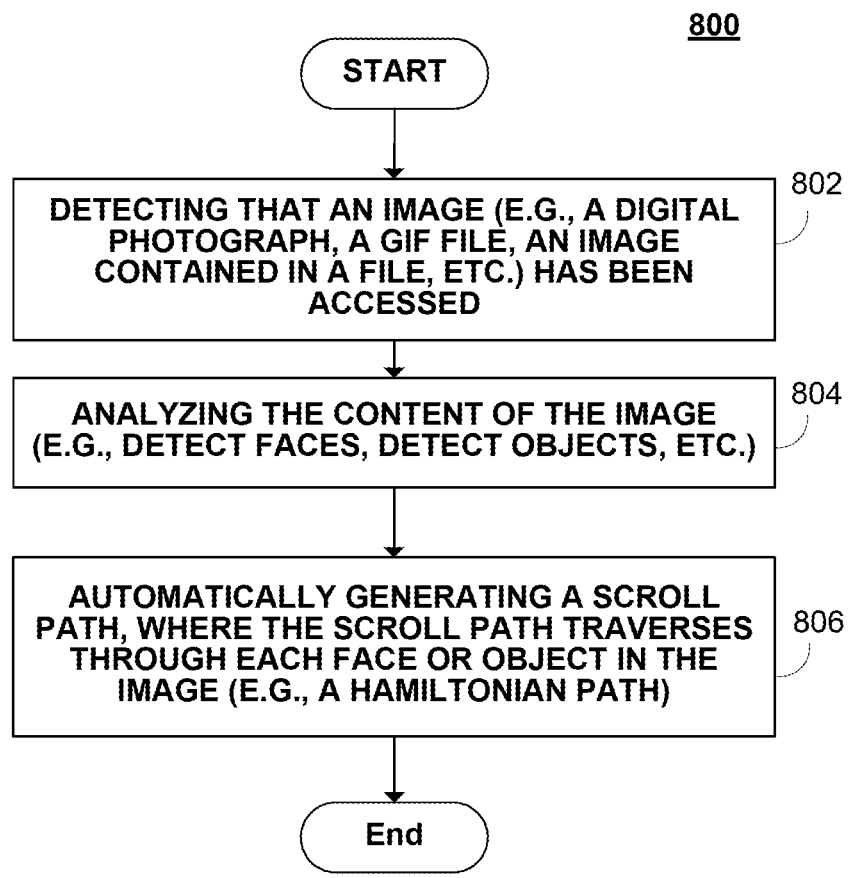
FIG. 8 is a diagram of a mechanism for providing content-aware scrolling for images in accordance with some embodiments.

In accordance with some embodiments, these mechanisms can detect that a particular type of document has been accessed and generate a corresponding scroll path. For example, as shown in FIGS. 8 and 9, in response to detecting than an image (e.g., a digital photograph, an image in Graphics Interchange Format (GIF), an image contained in a file, etc.), a scroll path can be generated through particular objects, where one or more of the direction, speed, and/or zoom through each object are varied during scrolling.

In response to detecting that an image (e.g., a digital photograph, an image in GIF format, etc.) has been accessed using an image viewing application or any other suitable application at 802, the content of the image can be analyzed at 804. For example, an image analysis application can be used to determine the location of the faces in a photograph. Each face in the photograph can be designated as an important region. A scroll path can be generated or automatically extracted that traverses through the important regions at 806. As shown in FIG. 9, each face in the photograph has been detected and a scroll path has been generated that, with scrolling, traverses through each face in the photograph with a one-dimensional gesture (e.g., a mouse scroll wheel, a single scrollbar arrow depression, etc.).

In some embodiments, the user can request that particular objects within an image be detected. For example, in response to selecting a "view faces" option, a face and eye detection web service (e.g., Betaface by Betaface Software) or any other suitable face detection and/or recognition application can be used to detect faces in a photograph.

Figure 9:
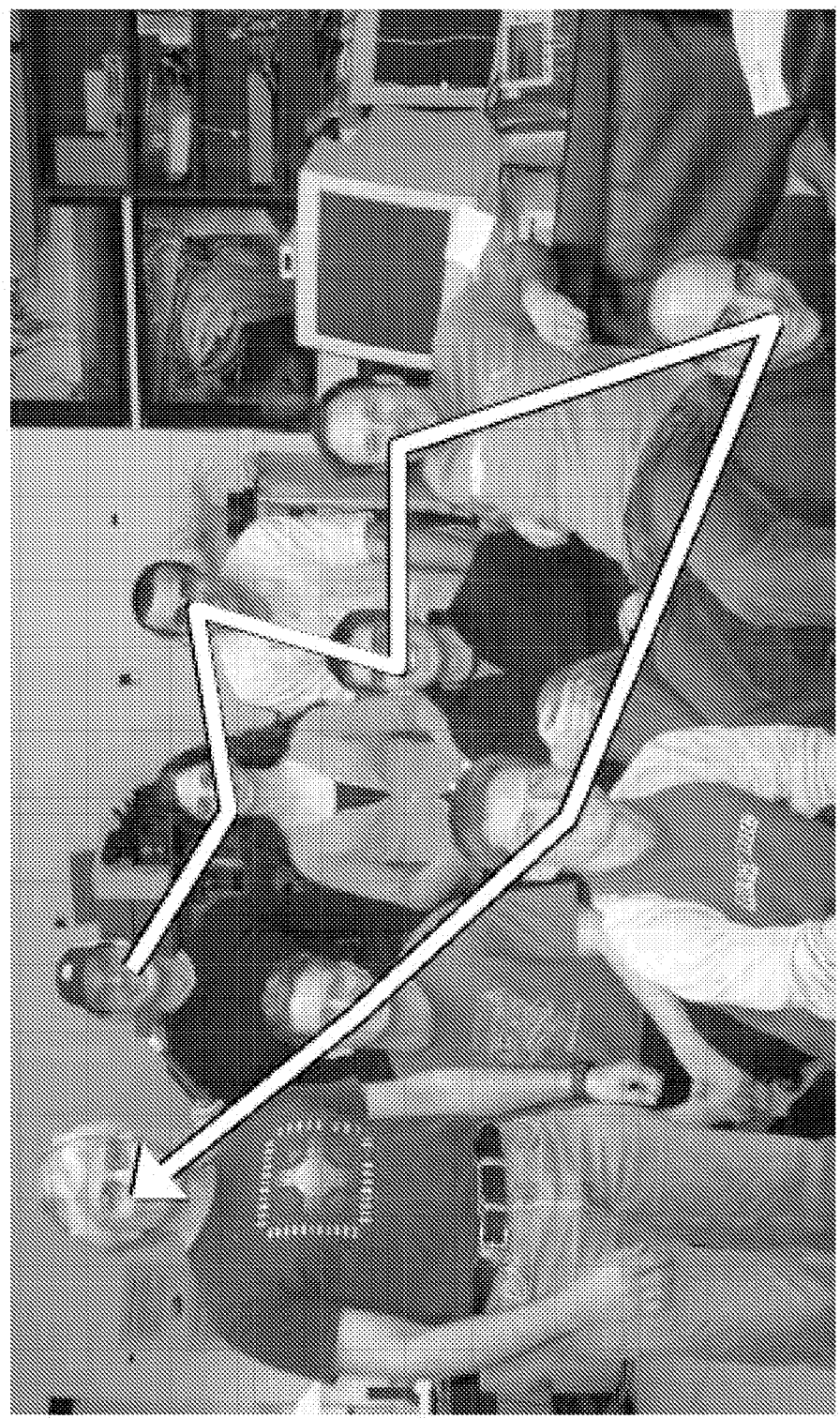
FIG. 9 is a diagram showing an example of a scroll path for an image in accordance with some embodiments.

It should be noted that, as shown in FIG. 9, the scroll path can be a Hamiltonian path through each of the faces in the photograph. Generally speaking, a Hamiltonian path is a path that visits each vertex or node exactly once.

In some embodiments, a scroll path can be defined by the user. For example, in response to opening the photograph in FIG. 9, the user can manually indicate the location of each face in a particular order. A scroll path is generated based on the user-indicated locations. In another example, the content-aware scrolling mechanisms can generate a scroll path and display the scroll path to the user (e.g., the solid portions of the scroll path and the dotted or dashed portions of the scroll path shown in FIGS. 3, 4, 7A, 7B, and 9). While these portions of the scroll path are generally not displayed to the user or overlaid onto the document, the user can edit the scroll path to create a user-generated scroll path.

In some embodiments, the user-generated scroll path can be stored as metadata, which is associated with the image. For example, a labeling application (e.g., Adobe XMP) can be used to store and associate the user-generated scroll path with the image. It should be noted that multiple scroll paths (e.g., reading scroll paths, search scroll paths, image scroll paths, etc.) can be stored in the metadata of a document. It should also be noted that the user can modify and/or remove scroll paths stored in the metadata of a document.

In some embodiments, a scroll path can be modified by a user in response to detecting that the content of a document has been changed (e.g., edited). For example, in response to detecting that the content of a document has been changed after the last scroll path was generated, the user can be provided with a path editor. Using the path editor, the user can modify the scroll path to account for the changed content. As another example, the user can use the path editor to create a new scroll path that accounts for the changed content.

Figure 10:
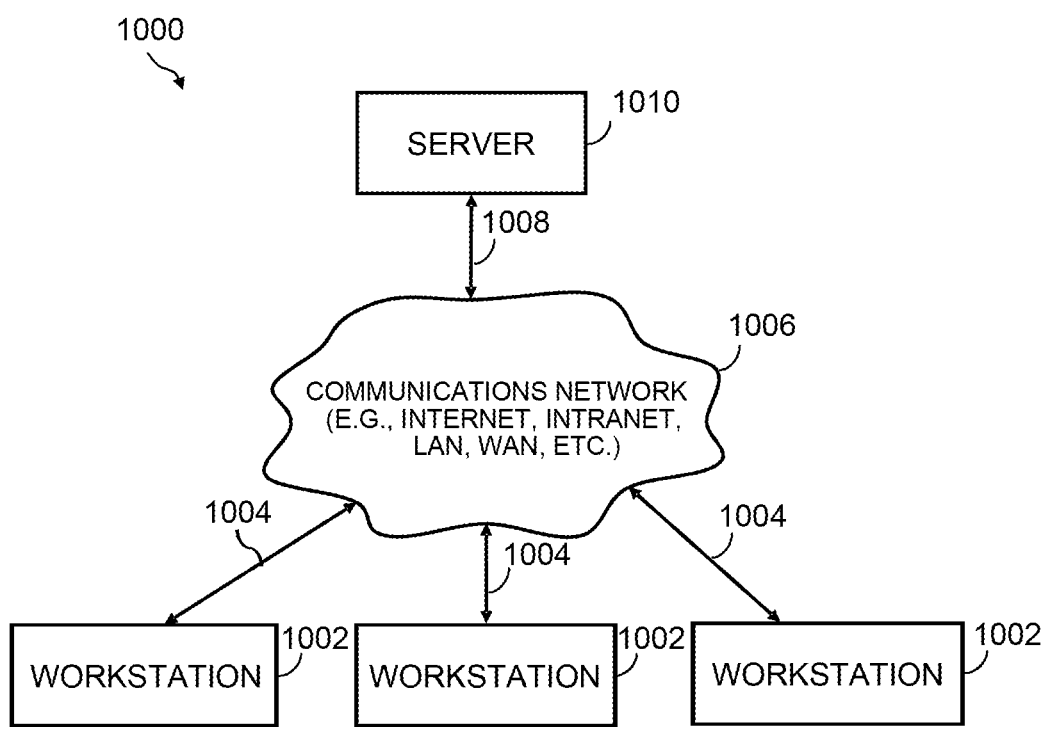
FIG. 10 is a schematic diagram of an illustrative system suitable for implementation of an application that provides content-aware scrolling in accordance with some embodiments.

FIG. 10 is a schematic diagram of an illustrative system 1000 suitable for implementation of an application that provides content-aware scrolling in accordance with some embodiments. As illustrated, system 1000 can include one or more workstations 1002. Workstations 1002 can be local to each other or remote from each other, and are connected by one or more communications links 1004 to a communications network 1006 that is linked via a communications link 1008 to a server 1010.

In system 1000, server 1010 can be any suitable server for executing the application, such as a processor, a computer, a data processing device, or a combination of such devices. Communications network 1006 can be any suitable computer network including, for example, the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 1004 and 1008 can be any communications links suitable for communicating data between workstations 1002 and server 1010, such as network links, dial-up links, wireless links, hard-wired links, etc. Workstations 1002 can be personal computers, laptop computers, mainframe computers, dumb terminals, data displays, Internet browsers, personal digital assistants (PDAs), two-way pagers, wireless terminals, portable telephones, etc., or any combination of the same. Workstations 1002 and server 1010 can be located at any suitable locations. In one embodiment, workstations 1002 and server 1010 can be located within an organization. Alternatively, workstations 1002 and server 1010 can be distributed between multiple organizations.

Figure 11:
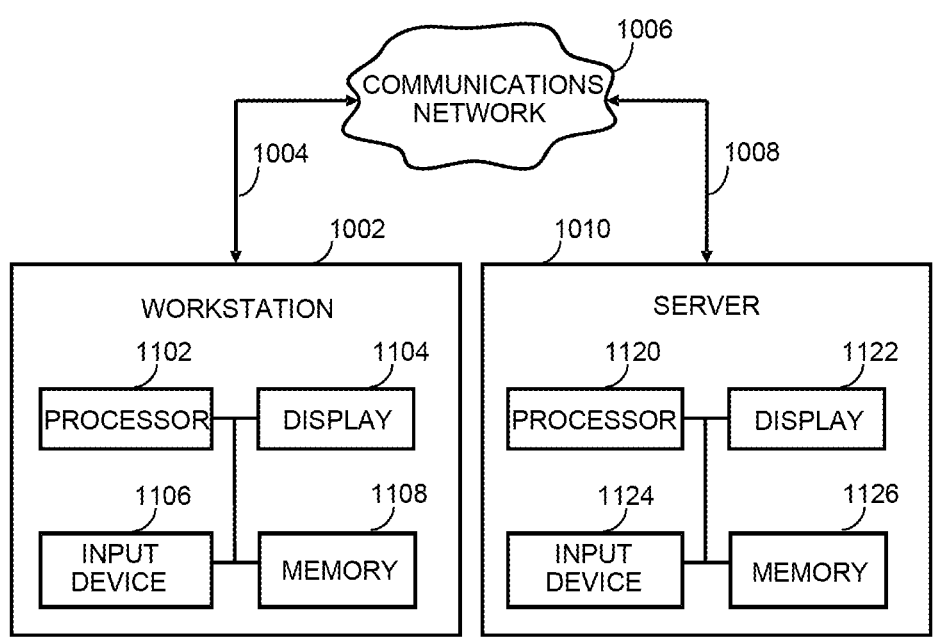
FIG. 11 is a detailed example of the server and one of the workstations of FIG. 10 that can be used in accordance with some embodiments.

The server and one of the workstations, which are depicted in FIG. 10, are illustrated in more detail in FIG. 11. Referring to FIG. 11, workstation 1002 can include processor 1102, display 1104, input device 1106, and memory 1108, which can be interconnected. In a preferred embodiment, memory 1108 contains a storage device for storing a workstation program for controlling processor 1102. Memory 1108 can also contain an application for providing content-aware scrolling in accordance with some embodiments. For example, memory 1108 can contain a content-aware scrolling widget. In some embodiments, the application can be resident in the memory of workstation 1002 or server 1010.

In one particular embodiment, the application can include client-side software, hardware, or both. For example, the application can encompass one or more Web-pages or Web-page portions (e.g., via any suitable encoding, such as HyperText Markup Language (HTML), Dynamic HyperText Markup Language (DHTML), Extensible Markup Language (XML), JavaServer Pages (JSP), Active Server Pages (ASP), Cold Fusion, or any other suitable approaches).

Although the application is described herein as being implemented on a workstation, this is only illustrative. The application can be implemented on any suitable platform (e.g., a personal computer (PC), a mainframe computer, a dumb terminal, a data display, a two-way pager, a wireless terminal, a portable telephone, a portable computer, a palmtop computer, a handheld personal computer (HIPC), an automobile PC, a laptop computer, a personal digital assistant (PDA), a combined cellular phone and PDA, etc.) to provide such features.

Processor 1102 can use the workstation program to present on display 1004 the application and the data received through communication link 1004 and commands and values transmitted by a user of workstation 1002. It should also be noted that data received through communication link 1004 or any other communications links can be received from any suitable source, such as web services. Input device 1106 can be a computer keyboard, a mouse, a touch-sensitive screen, a cursor-controller, a dial, a switchbank, lever, or any other suitable input device as would be used by a designer of input systems or process control systems.

Server 1010 can include processor 1120, display 1122, input device 1124, and memory 1126, which can be interconnected. In a preferred embodiment, memory 1126 contains a storage device for storing data received through communication link 1008 or through other links, and also receives commands and values transmitted by one or more users. The storage device further contains a server program for controlling processor 1120.

Accordingly, methods, systems, and media for providing content-aware scrolling are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

What is claimed is:

1. A method for providing content-aware scrolling, the method comprising:
    determining whether one or more regions of content in a document are important regions;
    designating one or more unimportant regions in response to determining whether one or more regions of content in the document are important regions;
    generating a scroll path that passes through the important regions, wherein at least one of direction, speed, and zoom are varied along the scroll path based on characteristics of the important regions;
    receiving a first user input to traverse along the scroll path in a first direction;
    traversing along the generated scroll path in the first direction through the important regions in response to receiving the first user input;
    receiving a second user input to traverse along the scroll path in a second direction that is opposite of the first direction;
    traversing along the generated scroll path in the second direction through the important regions in response to receiving the second user input; and
    varying the scrolling speed to traverse through the one or more unimportant regions by performing an animation through the one or more unimportant regions based on at least one of a size of the important regions and a distance between the important regions.

2. The method of claim 1, further comprising:
    detecting that the document has been accessed; and
    in response to detecting that the document has been accessed, extracting each character of content and a pixel location associated with each character.

3. The method of claim 1, further comprising:
    receiving a request to search for one or more characters through the document; and
    determining the search results in response to receiving the request, wherein the search results are designated as the important regions.

4. The method of claim 1, wherein the document includes a photograph including a plurality of faces, the method further comprising:
    detecting that the photograph has been accessed; and
    detecting the plurality of faces in the photograph, wherein the faces are designated as the important regions.

5. The method of claim 4, wherein the scroll path is a Hamiltonian path through each of the plurality of faces.

6. The method of claim 1, wherein the scroll path is automatically generated.

7. The method of claim 1, further comprising:
    receiving a plurality of user-inputted nodes; and
    generating the scroll path that traverses along the plurality of user-inputted nodes.

8. The method of claim 7, further comprising storing the scroll path having user-inputted nodes within metadata associated with the document.

9. The method of claim 1, further comprising displaying a viewport along with a single scrollbar.

10. The method of claim 1, wherein each line of content has a first character and a last character, wherein each important region is an area having a width and a height, and wherein the width comprises a left edge of the first character to a right edge of the last character of a line of content and the height comprises the height of the line of content.

11. A system for providing content-aware scrolling, the system comprising:
    means for determining whether one or more regions of content in a document are important regions;
    means for designating one or more unimportant regions in response to determining whether one or more regions of content in the document are important regions;
    means for generating a scroll path that passes through the important regions, wherein at least one of direction, speed, and zoom are varied along the scroll path based on characteristics of the important regions;
    means for receiving a first user input to traverse along the scroll path in a first direction;
    means for traversing along the generated scroll path in the first direction through the important regions in response to receiving the first user input;
    means for receiving a second user input to traverse along the scroll path in a second direction that is opposite of the first direction;
    means for traversing along the generated scroll path in the second direction through the important regions in response to receiving the second user input; and
    means for varying the scrolling speed to traverse through the one or more unimportant regions by performing an animation through the one or more unimportant regions based on at least one of a size of the important regions and a distance between the important regions.

12. The system of claim 11, further comprising:
    means for detecting that the document has been accessed; and
    in response to detecting that the document has been accessed, means for extracting each character of content and a pixel location associated with each character.

13. The system of claim 11, further comprising:
  means for receiving a request to search for one or more characters through the document; and
  means for determining the search results in response to receiving the request, wherein the search results are designated as the important regions.

14. The system of claim 11, wherein the document includes a photograph including a plurality of faces, the system further comprising:
  means for detecting that the photograph has been accessed; and
  means for detecting the plurality of faces in the photograph, wherein the faces are designated as the important regions.

15. The system of claim 14, wherein the scroll path is a Hamiltonian path through each of the plurality of faces.

16. The system of claim 11, further comprising means for automatically generating the scroll path.

17. The system of claim 11, further comprising:
  means for receiving a plurality of user-inputted nodes; and
  means for generating the scroll path that traverses along the plurality of user-inputted nodes.

18. The system of claim 17, further comprising means for storing the scroll path having user-inputted nodes within metadata associated with the document.

19. The system of claim 11, further comprising means for displaying a viewport along with a single scrollbar.

20. The system of claim 11, wherein each line of content has a first character and a last character, wherein each important region is an area having a width and a height, and wherein the width comprises a left edge of the first character to a right edge of the last character of a line of content and the height comprises the height of the line of content.

21. A system for providing content-aware scrolling, the system comprising:
  a processor that:
    determines whether one or more regions of content in a document are important regions;
    designates one or more unimportant regions in response to determining whether one or more regions of content in the document are important regions;
    generates a scroll path that passes through the important regions, wherein at least one of direction, speed, and zoom are varied along the scroll path based on characteristics of the important regions;
    receives a first user input to traverse along the scroll path in a first direction;
    traverses along the generated scroll path in the first direction through the important regions in response to receiving the first user input;
    receives a second user input to traverse along the scroll path in a second direction that is opposite of the first direction;
    traverses along the generated scroll path in the second direction through the important regions in response to receiving the second user input; and
    varies the scrolling speed to traverse through the one or more unimportant regions by performing an animation through the one or more unimportant regions based on at least one of a size of the important regions and a distance between the important regions.

22. The system of claim 21, wherein the processor is further configured to:
  detect that the document has been accessed; and
  in response to detecting that the document has been accessed, extract each character of content and a pixel location associated with each character.

23. The system of claim 21, wherein the processor is further configured to
  receive a request to search for one or more characters through the document; and
  determine the search results in response to receiving the request, wherein the search results are designated as the important regions.

24. The system of claim 21, wherein the document includes a photograph including a plurality of faces, and wherein the processor is further configured to:
  detect that the photograph has been accessed; and
  detect the plurality of faces in the photograph, wherein the faces are designated as the important regions.

25. The system of claim 24, wherein the scroll path is a Hamiltonian path through each of the plurality of faces.

26. The system of claim 21, wherein the processor is further configured to automatically generate the scroll path.

27. The system of claim 21, wherein the processor is further configured to:
  receive a plurality of user-inputted nodes; and
  generate the scroll path that traverses along the plurality of user-inputted nodes.

28. The system of claim 27, wherein the processor is further configured to store the scroll path having user-inputted nodes within metadata associated with the document.

29. The system of claim 21, wherein the processor is further configured to display a viewport along with a single scrollbar.

30. The system of claim 21, wherein each line of content has a first character and a last character, wherein each important region is an area having a width and a height, and wherein the width comprises a left edge of the first character to a right edge of the last character of a line of content and the height comprises the height of the line of content.

31. A non-transitory computer-readable medium storing computer-executable instructions that, when executed by a processor, causes the processor to perform a method for providing content-aware scrolling, the method comprising:
  determining whether one or more regions of content in a document are important regions;
  designating one or more unimportant regions in response to determining whether one or more regions of content in the document are important regions;
  generating a scroll path that passes through the important regions, wherein at least one of direction, speed, and zoom are varied along the scroll path based on characteristics of the important regions;
  receiving a first user input to traverse along the scroll path in a first direction;
  traversing along the generated scroll path in the first direction through the important regions in response to receiving the first user input;
  receiving a second user input to traverse along the scroll path in a second direction that is opposite of the first direction;
  traversing along the generated scroll path in the second direction through the important regions in response to receiving the second user input; and
  varying the scrolling speed to traverse through the one or more unimportant regions by performing an animation through the one or more unimportant regions based on at least one of a size of the important regions and a distance between the important regions.

32. The non-transitory computer-readable medium of claim 31, wherein the method further comprises:
  detecting that a document has been accessed; and in response to detecting that the document has been accessed, extracting each character of content and a pixel location associated with each character.

33. The non-transitory computer-readable medium of claim 31, wherein the method further comprises:
    receiving a request to search for one or more characters through the document; and
    determining the search results in response to receiving the request, wherein the search results are designated as the important regions.

34. The non-transitory computer-readable medium of claim 31, wherein the document includes a photograph including a plurality of faces, and wherein the method further comprises:
    detecting that the photograph has been accessed; and
    detecting the plurality of faces in the photograph, wherein the faces are designated as the important regions.

35. The non-transitory computer-readable medium of claim 34, wherein the scroll path is a Hamiltonian path through each of the plurality of faces.

36. The non-transitory computer-readable medium of claim 31, wherein the method further comprises automatically generating the scroll path.

37. The non-transitory computer-readable medium of claim 31, wherein the method further comprises:
    receiving a plurality of user-inputted nodes; and
    generating the scroll path that traverses along the plurality of user-inputted nodes.

38. The non-transitory computer-readable medium of claim 37, wherein the method further comprises storing the scroll path having user-inputted nodes within metadata associated with the document.

39. The non-transitory computer-readable medium of claim 31, wherein the method further comprises displaying a viewport along with a single scrollbar.

40. The non-transitory computer-readable medium of claim 31, wherein each line of content has a first character and a last character, wherein each important region is an area having a width and a height, and wherein the width comprises a left edge of the first character to a right edge of the last character of a line of content and the height comprises the height of the line of content.

* * * * *